United States Patent
Lim (10) Patent No.: US 8,400,529 B2
(45) Date of Patent: Mar. 19, 2013

(54) BUFFER MEMORY FOR ROTATING IMAGE, IMAGE CAPTURE DEVICE AND DISPLAY DEVICE INCLUDING THE SAME

(75) Inventor: Eui Cheol Lim, Hwasung-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 592 days.

(21) Appl. No.: 12/580,035

(22) Filed: Oct. 15, 2009

(65) Prior Publication Data

US 2010/0110230 A1 May 6, 2010

(30) Foreign Application Priority Data

Nov. 5, 2008 (KR) .................. 10-2008-0109285

(51) Int. Cl.
*H04N 5/76* (2006.01)
(52) U.S. Cl. .................. 348/231.99; 348/374
(58) Field of Classification Search .......... 348/51, 348/231.99, 333.01, 374
See application file for complete search history.

(56) References Cited

U.S. PATENT DOCUMENTS

| | | | |
|---|---|---|---|
| 5,329,929 A * | 7/1994 | Sato et al. ............ | 600/441 |
| 7,256,791 B2 * | 8/2007 | Sullivan et al. ........ | 345/545 |
| 2003/0025700 A1 * | 2/2003 | Sasaki et al. .......... | 345/531 |
| 2005/0283079 A1 * | 12/2005 | Steen et al. ........... | 600/447 |

FOREIGN PATENT DOCUMENTS

| | | |
|---|---|---|
| JP | 06-096196 | 4/1994 |
| JP | 06-231236 | 8/1994 |
| JP | 2000-172838 | 6/2000 |
| JP | 2007-334817 | 12/2007 |

* cited by examiner

Primary Examiner — Gevell Selby
(74) Attorney, Agent, or Firm — F. Chau & Associates, LLC

(57) ABSTRACT

A buffer memory for rotating an image. The buffer memory is address-mapped in three dimensions including a first axis, a second axis, and a third axis, that are orthogonal to one another. Data may be sequentially accessed (read from or written to) the buffer memory in each of the direction of the first axis, the direction of the second axis, and the direction of the third direction. Second data may written to a given plane of the buffer memory at the same time that first data is read from the same plane of the buffer memory.

19 Claims, 9 Drawing Sheets

BUFFER MEMORY FOR ROTATING IMAGE, IMAGE CAPTURE DEVICE AND DISPLAY DEVICE INCLUDING THE SAME

CROSS-REFERENCE TO RELATED APPLICATIONS

This application claims the priority, under 35 U.S.C. §119, of Korean Patent Application No. 10-2008-0109285, filed on Nov. 5, 2008, the entire contents of which are incorporated by reference herein.

BACKGROUND OF THE INVENTION

1. Field of the Invention

The present invention relates to semiconductor devices, and more particularly, to a semiconductor buffer memory having a cube shape that minimizes the memory size needed for image rotation and to allow addressing to be performed with a simple logic, and an image capture device and display device including the same.

2. Description of the Related Art

When an image capture device (e.g., a digital camera) rotates a captured image to store it in a main memory or rotates an image stored in the main memory to display it, conventionally a two-line memory buffer may be used. For instance, to rotate a 1024×768 image by 90 degrees with a 32-bit bus and 4-burst transaction, a 2×16×768 byte (about 24 Kbyte)-line buffer memory is needed. When the burst size of access transaction of the buffer memory increases, the performance of image rotation also increases. However, to increase the burst size, the size of the buffer memory needs to be increased, which is not desirable for the compactness of the image capture device. Moreover, conventionally, the size of the buffer memory cannot be decreased and, since a read or write address is not fixed, it is difficult to design the buffer memory in hardware.

Figure 1A:
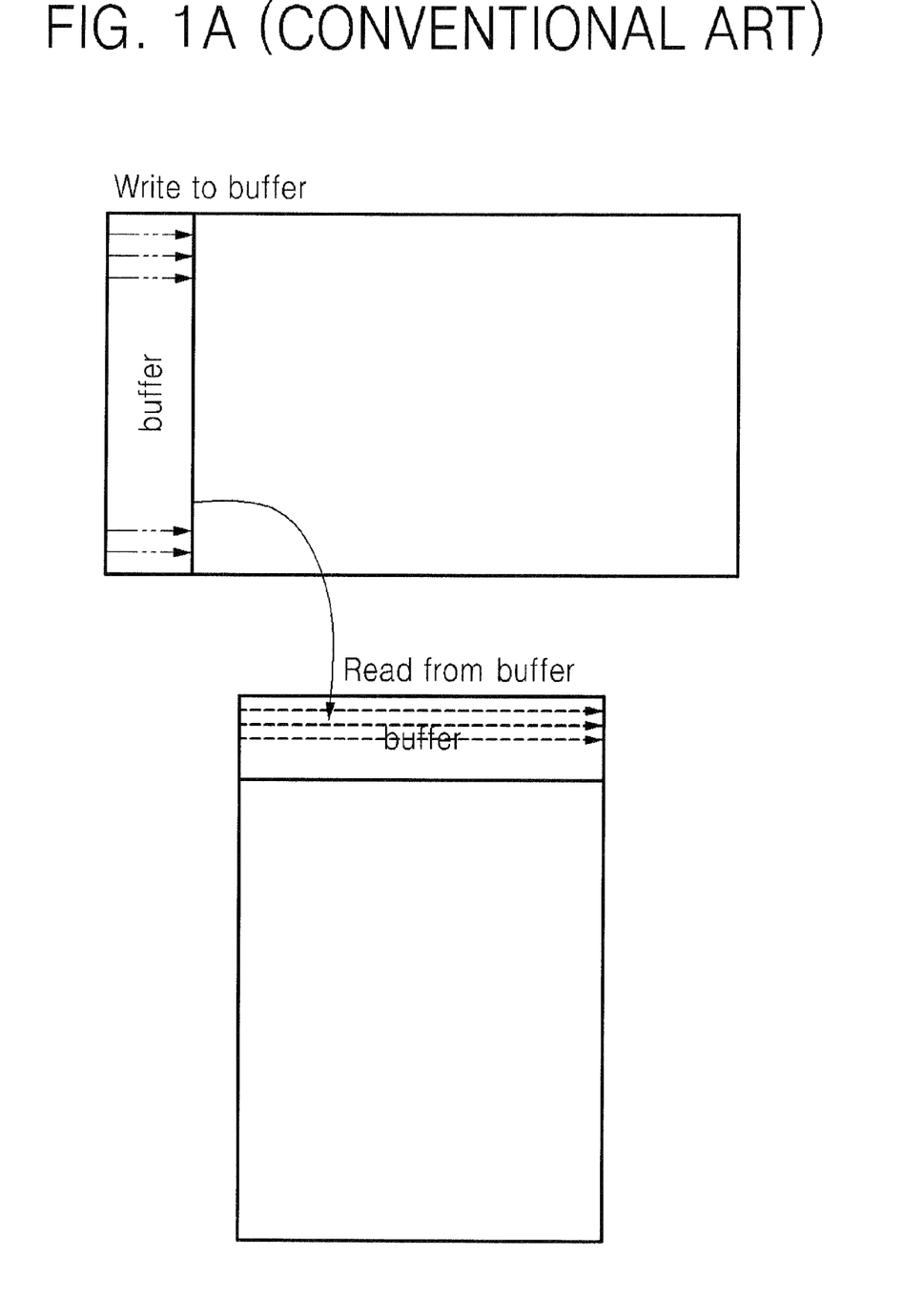
FIG. 1A is a schematic diagram showing the operating principle of a conventional buffer memory for rotating an image.

FIG. 1A is a schematic diagram of a conventional buffer memory for explaining the write/read operation of a conventional buffer memory for rotating an image. Referring to FIG. 1A, a display device needs to continuously output an image using raster scanning and to read the image in a rotated state, and therefore, the image cannot be read until the image is entirely written to a line buffer memory.

Figure 1B:
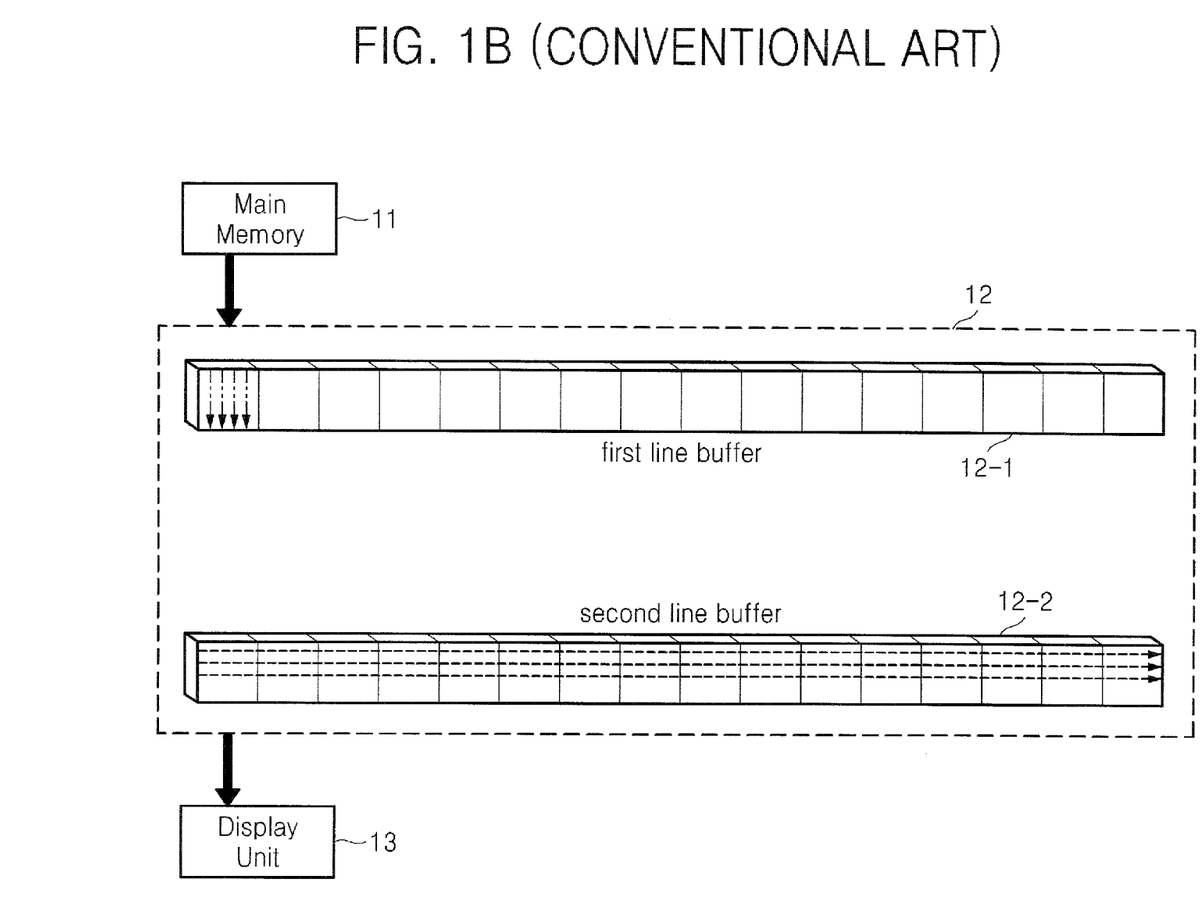
FIG. 1B is a schematic block diagram of a conventional buffer memory for rotating an image.

As illustrated in greater detail in FIG. 1B, an image needs to be continuously output to a display unit 13 in raster scan order, and for this operation the image has already been written to a buffer memory 12 to be read in a rotated state. In addition, to accomplish real-time display, while the display unit 13 is reading first data of a certain size from one line of buffer memory (e.g., a second line buffer 12-2) included in the buffer memory 12, a second data of the certain size is read from the main memory 11 and written to another line buffer memory (e.g., a first line buffer 12-1) included in the buffer memory 12.

Accordingly, the conventional buffer memory 12 includes the two line buffer memories 12-1 and 12-2 and uses a method of writing an image, which will be read in a rotated state, to one of the two line buffer memories 12-1 and 12-2 while another image is being read in a rotated state from the other of the two line buffer memories 12-1 and 12-2. This conventional buffering method for image rotation requires a large memory size, and therefore, it does not facilitate the miniaturization of image capture devices or display devices.

SUMMARY OF THE INVENTION

Some embodiments of the present invention provides a buffer memory for rotating an image, that minimizes the memory size necessary for image rotation and allows addressing to be easily performed, and an image capture device and display device including the same.

According to some embodiments of the present invention, there is provided a buffer memory for rotating an image. The buffer memory is address-mapped in three dimensions comprising a first axis, a second axis, and a third axis, which are orthogonal to one another. Data can be read from or written to the buffer memory in any of the direction of the first axis, the direction of the second axis, and the direction of the third axis. The buffer memory may have the same data storage capacity in each of the directions of the first through third axes. The data storage capacity may be $2^N$ bytes where N is a natural number.

The buffer memory may be address-mapped by $\{z[N-1:0], y[N-1:0], x[N-1:0]\}$ where "x" is a coordinate of the first axis, "y" is a coordinate of the second axis, and "z" is a coordinate of the third axis. First data may be read from a first plane formed by two axes among the first through third axes and simultaneously second data may be written to the first plane. The second data may be written to the first plane in the same order as the first data is read from the first plane.

According to other embodiments of the present invention, there is provided an image capture device including an image capture unit configured to capture an image, a main memory configured to store the image capture by the image capture unit, a buffer memory configured to buffer the image captured by the image capture unit (and to transmit the image to the main memory or to an image display device), and a controller configured to control a read operation or a write operation of the main memory or the buffer memory. The buffer memory is address-mapped in three dimensions including a first axis, a second axis, and a third axis, that are orthogonal to one another. Data is read from or written to the buffer memory in the direction of the first axis, the direction of the second axis, and the direction of the third axis.

The controller may address the buffer memory clockwise to control the read and write operations. The controller may write second data captured by the image capture unit to the buffer memory and simultaneously read first data from the buffer memory and store it in the main memory.

According to another embodiment of the present invention, there is provided a display device including a main memory configured to store an image, a display unit configured to output the image stored in the main memory (e.g., in a rotated or non rotated state), a buffer memory configured to buffer the image stored in the main memory (and to transmit the image to the main memory or to the display unit), and a controller configured to control a read operation or a write operation of the main memory or the buffer memory. The buffer memory is address-mapped in three dimensions comprising a first axis, a second axis, and a third axis, that are orthogonal to one another. Data can be read from or written to the buffer memory in any of the direction of the first axis, the direction of the second axis, and the direction of the third axis. The controller may address the buffer memory counterclockwise to control the read and write operations. The controller may write second data stored in the main memory to the buffer memory and simultaneously read first data from the buffer memory and transmit it to the display unit.

The present invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first axis could be termed a second axis, and, similarly, a second axis could be termed a first axis without departing from the teachings of the disclosure.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 2:
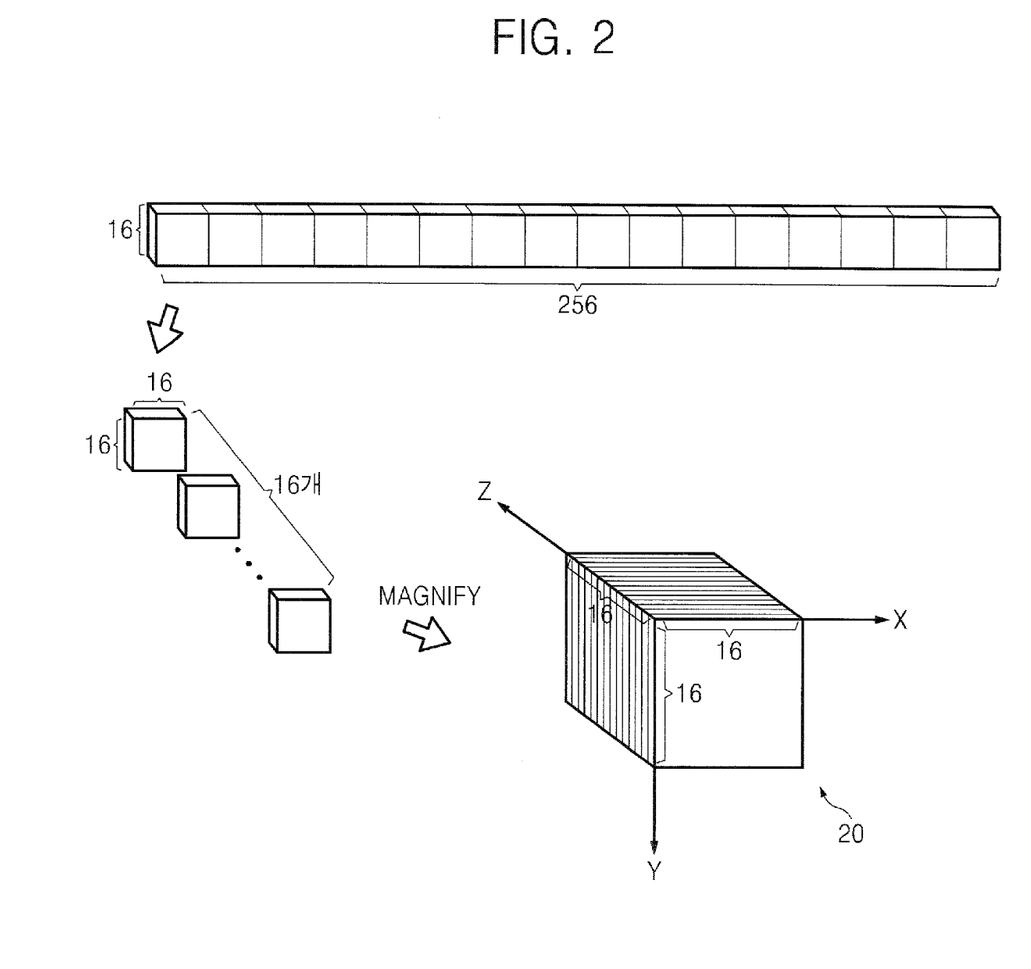
FIG. 2 is a schematic diagram showing a method of forming a buffer memory 20 for rotating an image according to an embodiment of the present invention.

FIG. 2 is a schematic diagram of a method of forming a buffer memory 20 for rotating an image according to an embodiment of the present invention. For clarity of the description, a 16-line buffer satisfying 32-bit 4-burst transaction and an image having a vertical resolution of 256 are used in the exemplary embodiments of the present invention.

Unlike the conventional buffer memory for rotating an, image that includes two line buffer memories, the buffer memory 20 according to the current embodiment of the present invention three-dimensionally maps an address using a single line buffer memory and achieves the same effect as that obtained when the two line buffer memories are used. A line buffer memory having a size of 16×256 is divided into 16 macro units having a size of 16×16 and the line buffer memory is subjected to address mapping so that the 16 macro units are stacked. Consequently, the buffer memory 20 having a cube shape can be logically embodied, as illustrated in FIG. 2.

The buffer memory 20 may read or write data in one direction among a first axis (e.g., an x-axis) direction, a second axis (e.g., a y-axis) direction, and a third axis (e.g., a z-axis) direction, which are orthogonal to one another. The first axis (e.g., the x-axis), the second axis (e.g., the y-axis), and the third axis (e.g., the z-axis) define three planes (e.g., an x-y plane, a y-z plane, and a z-x plane). The buffer memory 20 reads first data from one of the three planes and simultaneously write second data to the same plane. The second data may be written to one plane in the same order as the first data is read from the plane.

As described above, the buffer memory 20 may be address-mapped to a cube shape and have the same data storage capacity in each axis direction. The buffer memory 20 may have a data storage capacity (depth d) of $2^N$ (where N is a natural number) bytes in each axis direction. In the embodiments illustrated in FIG. 2, N is 4, and the depth "d" of the buffer memory is 16 bytes. When data capacity is $2^N$ bytes in reading data from or writing data to each axis, an addressing scheme for the buffer memory 20 may be simple. When the buffer memory 20 has the $2^N$-byte data capacity in each axis direction, addressing of the buffer memory 20 can be implemented by a simple formula of $\{z[N-1;0], y[N-1;0], x[N-1;0]\}$. For instance, to access the x-y plane, the following simple logic can be used:

for (z=0; z++; z<d)
  for (x=0; x++; x<d)
    for (y=0; y++; y<d)
      Access (x,y,z), where "d" is the depth of the buffer memory 20. In the embodiments illustrated in FIG. 2, depth "d" is 16.

Figure 3:
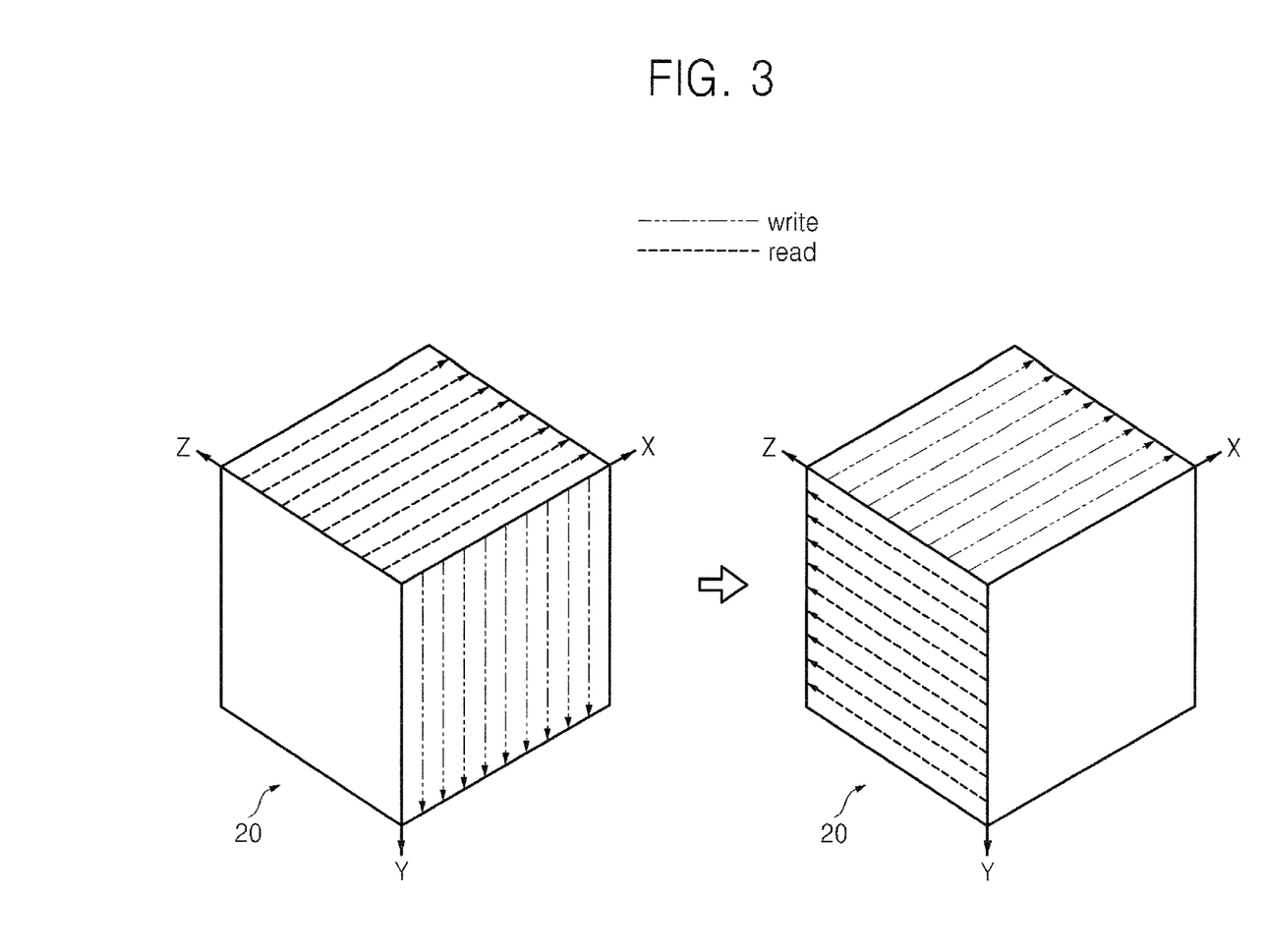
FIG. 3 is a diagram for explaining a method of reading data from and writing data to the buffer memory 20 for rotating an image, according to an embodiment of the present invention.

FIG. 3 is a diagram of the three-dimensionally mapped buffer memory 20 for explaining a method of reading data from and a method of writing data to the buffer memory 20 for rotating an image, according to an embodiment of the present invention. FIG. 3 shows the state of the buffer memory 20 when an image stored in a main memory is displayed in a rotated state by a display device.

When no data has been written to the buffer memory 20, a write operation may be performed first. For instance, after 16×16 data is all written to the x-y plane at which z=0, the data is written to an x-y plane at which z=1, and when the writing is repeated with incremental increases of the value of "z", i.e., the coordinate of the z-axis, rotating an image can be written to the x-y planes.

When a 16-line image is all written to the buffer memory 20, data of the image may be read in a raster scan order and transmitted to a display unit (not shown). Data may be read in an arrow-indicated direction on z-x planes and transmitted to the display unit wherein the value of "y", i.e., the coordinate of the y-axis increases by increments of 1 from 0 to 16. At the same time, other data from a main memory (not shown) may be written to the buffer memory 20 in the same order (or direction) as the data stored in the buffer memory 20 is read.

As described above, the initial writing is performed on the x-y planes. After 16-line data is all written to the x-y planes, writing may be performed on the z-x planes. Thereafter, in the same manner, writing may be performed on y-z planes. And then the x-y planes are subjected to a write operation again. Accordingly, a controller (not shown) included in a display device (not shown) controls the read or write operation of the buffer memory 20 while addressing counterclockwise. In other words, when a single line buffer memory 20 is three-dimensionally mapped in a cube shape, the read operation and the write operation can be simultaneously performed.

Figure 4:
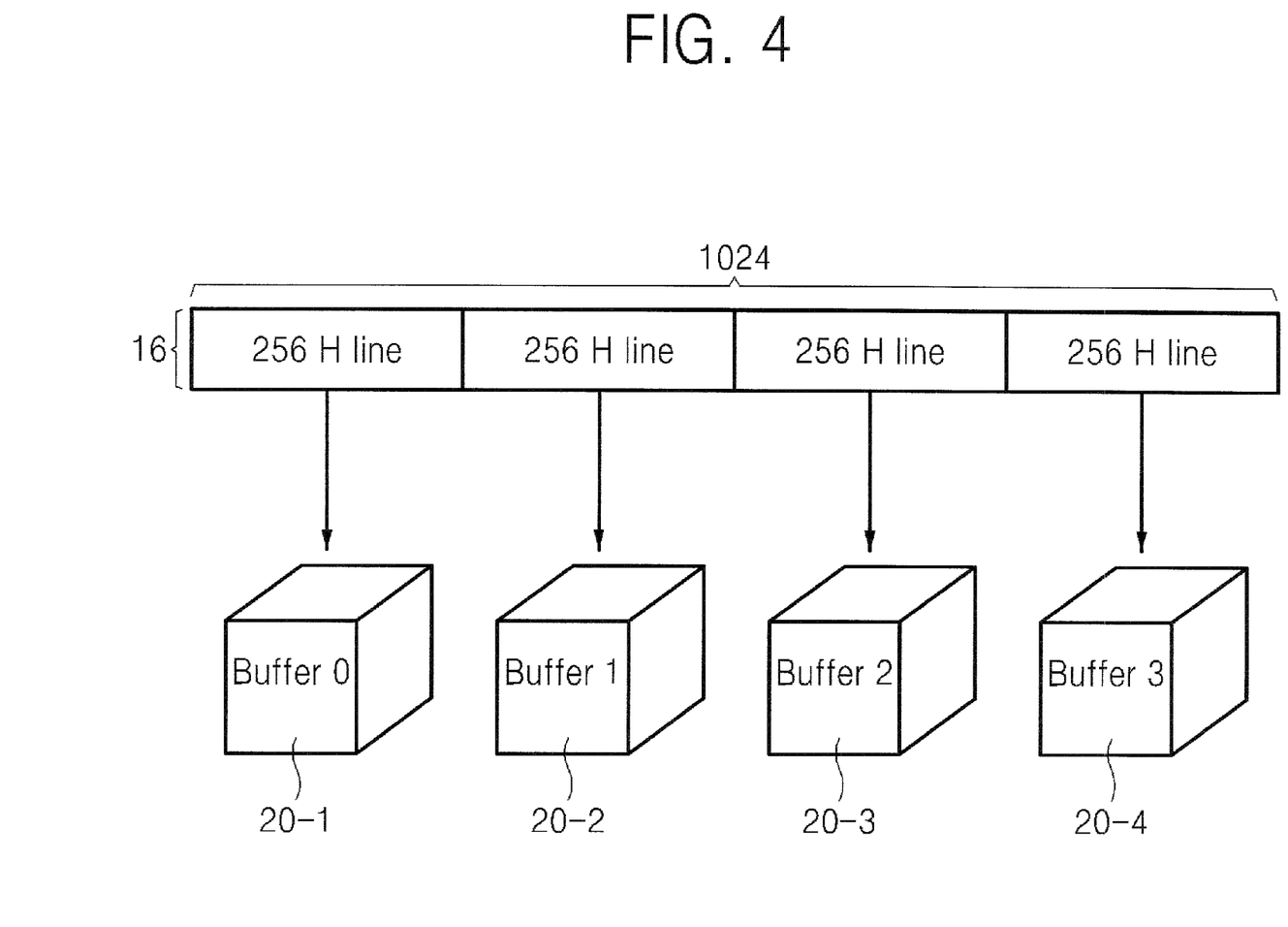
FIG. 4 is a diagram of four three-dimensionally mapped buffer memories for explaining a method of rotating a large image using the buffer memories 20 for rotating an image, according to an embodiment of the present invention.

FIG. 4 is a diagram of four three-dimensionally mapped buffer memories 20-1, 20-2, 20-3, and 20-4, for explaining a method of rotating a large image using the buffer memory 20 of FIG. 2 for rotating an image, according to an embodiment of the present invention. As described above, a conventional line buffer memory having depth d=16 and 256 bytes in horizontal (H) line size may be replaced by the buffer memory 20 having depth d=16 three-dimensionally mapped in a cube shape. Accordingly, to implement the buffer memory 20, the length (e.g., 256) of the H line is be the square of the depth "d" of the buffer memory 20.

To rotate an extended graphic array (XGA) (1024×768) image having an H line size of 1024 bytes, four buffer memories 20-1, 20-2, 20-3, and 20-4 having depth d=16 for rotating an image may be used, as illustrated in FIG. 4. Alternatively, a single buffer memory 20 having depth d=32 may be used. The four buffer memories 20-1 through 20-4 may be implemented by four static random access memories (SRAMs) or by a single SRAM, but the present invention is not limited to the exemplary embodiments. In other embodiments, the buffer memory 20 may be implemented using dynamic random access memory (DRAM), synchronous DRAM (SDRAM), or non-volatile random access memory (NVRAM).

Referring to FIG. 4, the four buffer memories 20-1 through 20-4 may be implemented by a single SRAM by designating the two most significant bits of each of the four buffer memories 20-1 through 20-4. For instance, a formula of {2'b00, z[3:0], y[3:0], x[3:0]} may be used to address the first buffer memory 20-1 and a formula of {2'b01, z[3:0], y[3:0], x[3:0]} may be used to address the second buffer memory 20-2.

In addition, a line buffer memory having an H line size of 256, 512, 768, 1024, 1280, or 1536 bytes or the like can be replaced using the buffer memory 20 having d=16 in a cube shape. For instance, to rotate an image having a maximum H line size of 1092 bytes, eight buffer memories 20 having depth d=16 three-dimensionally mapped in a cube shape may be used. When a conventional two-line buffer is used, 61,440 bytes (=16 depth×1920 line size×2 lines) of memory are needed. However, when the three-dimensionally mapped buffer memory 20 is used, only 32,768 bytes (=16×16×16×8) of memory are needed, and therefore, the buffer memory size can be reduced by about half.

In the above exemplary embodiments of the present invention, the three-dimensionally mapped buffer memory 20 has been used for rotating an image, but in various other embodiments of the present invention the buffer memory 20 can also be used for any applications, like a JPEG input buffer, in which a data reading order is different from a data writing order.

Figure 5A:
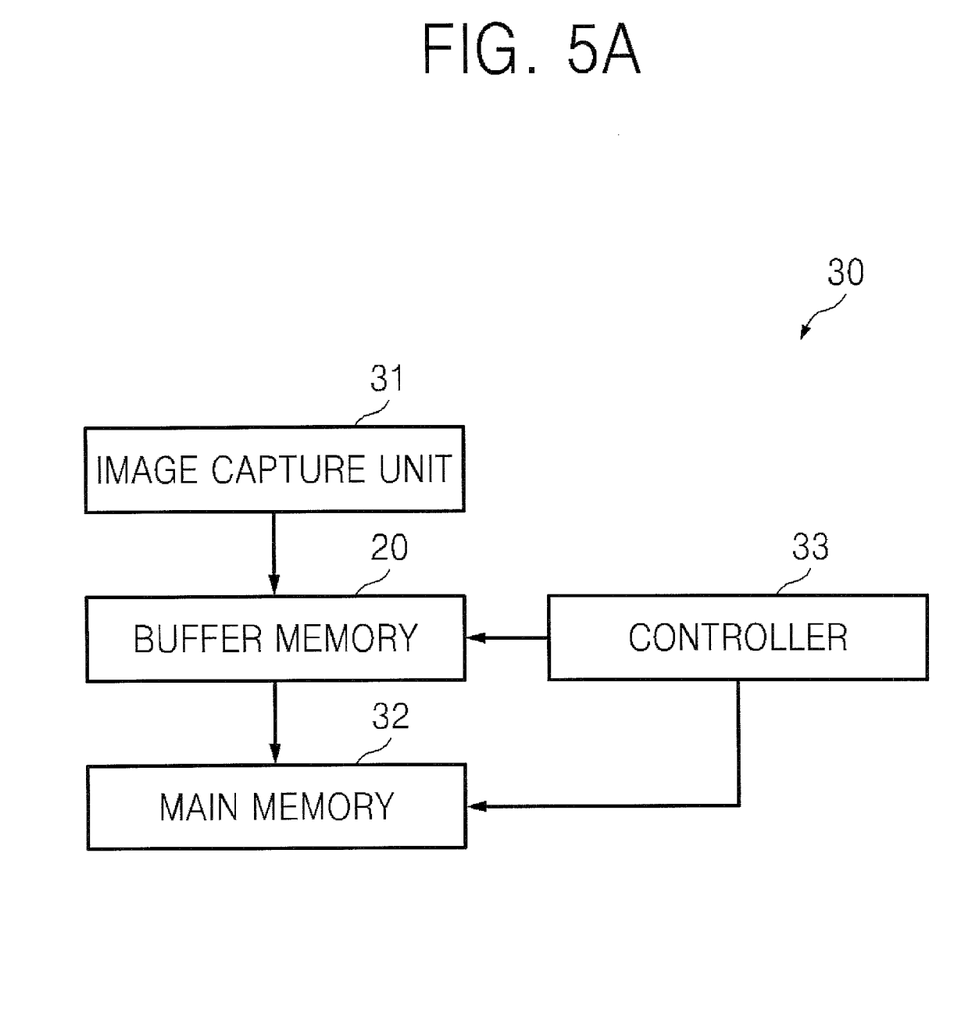
FIG. 5A is a block diagram of an image capture device including a buffer memory 20 for rotating an image according to an embodiment of the present invention.
Figure 5B:
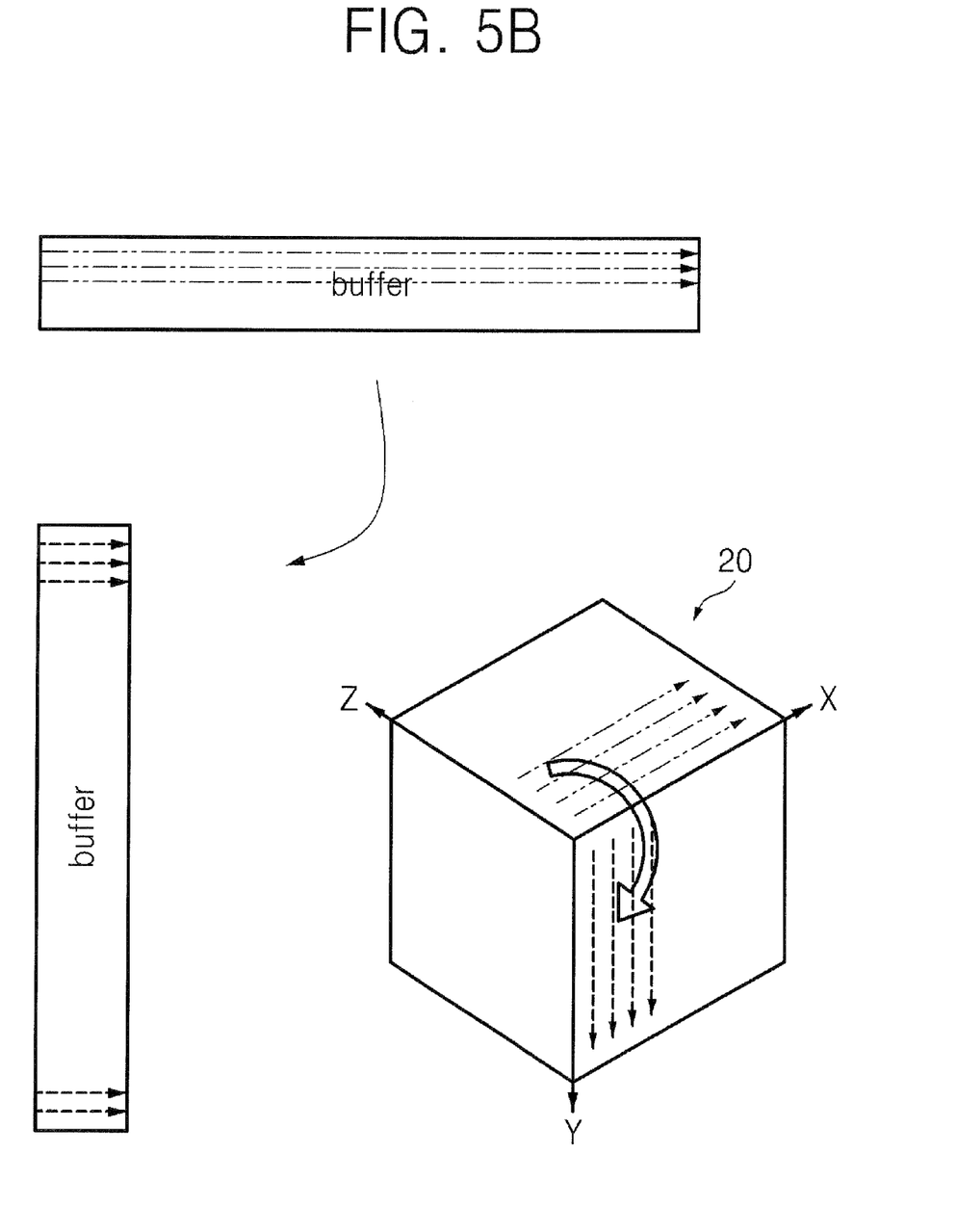
FIG. 5B is a diagram for explaining a method of addressing the buffer memory 20 in the image capture device 30 of FIG. 5A.

FIG. 5A is a block diagram of an image capture device 30 including the three-dimensionally mapped buffer memory 20 for rotating an image according to an exemplary embodiment of the present invention. FIG. 5B is a diagram for explaining a method of addressing the buffer memory 20 in the image capture device 30 of FIG. 5A. The image capture device 30 may include an image capture unit 31, the buffer memory 20, a main memory 32, and a controller 33.

The image capture unit 31 may captures an image and the main memory 32 may store the image in a rotated state. The buffer memory 20 may buffer the image capture by the image capture unit 31 and then transmit it to the main memory 32. As described above, the buffer memory 20 has a three-dimensionally mapped cube shape that data may be written to or read from in each of three axis directions orthogonal to one another. As illustrated in FIG. 5B, the data reading order is different from the data writing order for rotating an image, and therefore, the controller 33 may control the data read or write operation by addressing the buffer memory 20 clockwise.

Figure 6A:
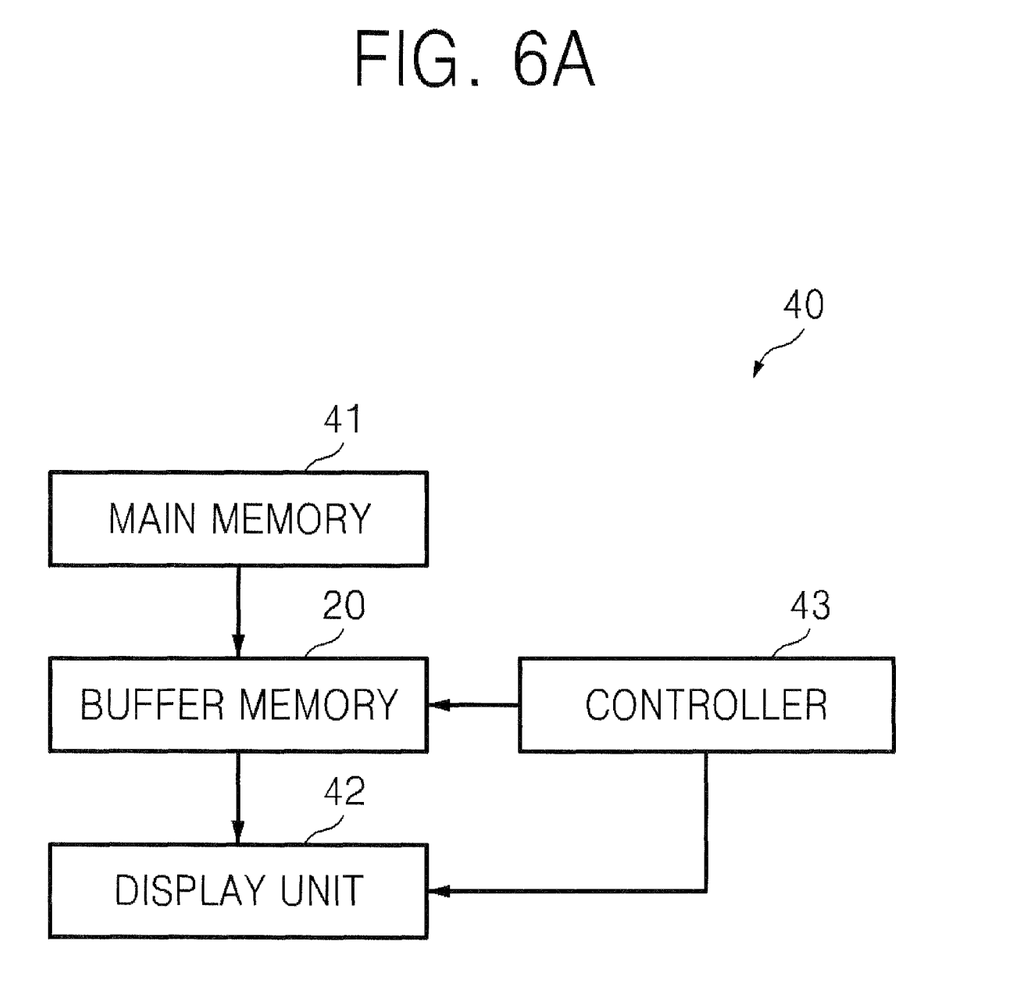
FIG. 6A is a block diagram of a display device including a buffer memory 20 for rotating an image according to an embodiment of the present invention.
Figure 6B:
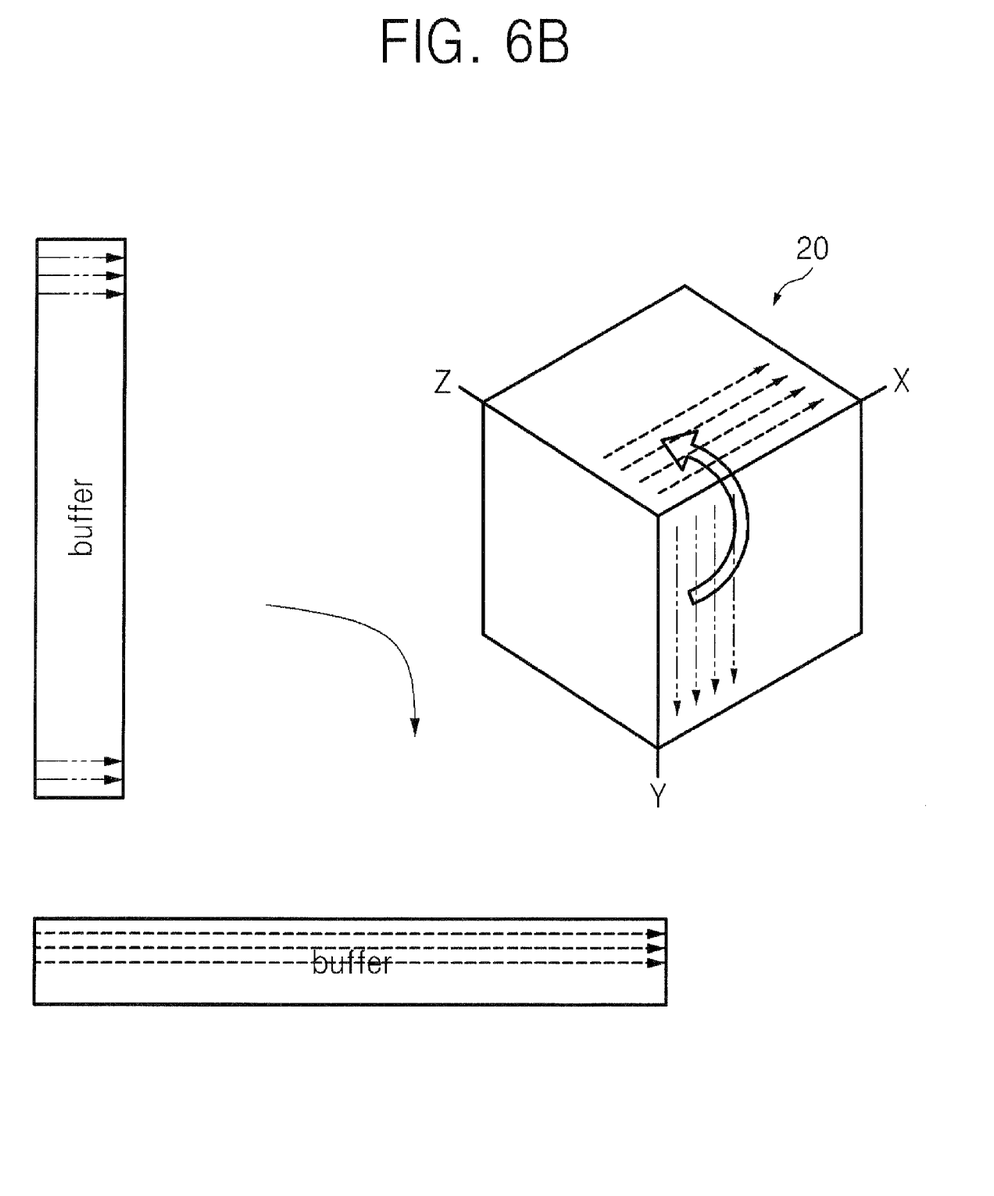
FIG. 6B is a diagram for explaining a method of addressing the buffer memory 20 in the display device 40 of FIG. 6A.

FIG. 6A is a block diagram of an image display device 40 including the buffer memory 20 for rotating an image according to an exemplary embodiment of the present invention. FIG. 6B is a diagram for explaining a method of addressing the buffer memory 20 in the display device 40 of FIG. 6A. The display device 40 includes a main memory 41, the buffer memory 20, a display unit 42, and a controller 43.

The main memory 41 stores the image and the display unit 42 may output the image in a rotated state. The buffer memory 20 buffers the image stored in the main memory 41 and then transmit it to the display unit 42. As described above, the buffer memory 20 has a cube shape that data may be written to or read from in any of three axis directions orthogonal to one another. As illustrated in FIG. 6B, the data reading order for a non-rotated image is different from a data writing order for rotating an image, and therefore, the controller 43 may control the data read or write operation by addressing the buffer memory 20 counterclockwise.

According to various embodiments of present invention, the memory size necessary for image rotation in a buffer memory can be minimized. In addition, address mapping of the buffer memory becomes possible with just a simple logic.

While the present invention has been particularly shown and described with reference to exemplary embodiments thereof, it will be understood by those of ordinary skill in the art that various changes in forms and details may be made thereto without departing from the spirit and scope of the present invention as defined by the following claims.

What is claimed is:

1. A buffer memory for rotating an image, the buffer memory being address-mapped in three dimensions comprising a first axis, a second axis, and a third axis, orthogonal to one another, wherein data is written to the buffer memory in only a first direction selected from among the first axis, the second axis, and the third axis, wherein data is read from the buffer memory in only a second direction selected from among the first axis, the second axis, and the third axis, and wherein the first direction is different from the second direction.

2. The buffer memory of claim 1, wherein the buffer memory has the same data storage capacity in each of the directions of the first through third axes.

3. The buffer memory of claim 2, wherein the data storage capacity is $2^N$ bytes where N is a natural number.

4. The buffer memory of claim 3, wherein the buffer memory is address-mapped by {z[N−1:0], y[N−1:0], x[N−1:0]} where "x" is a coordinate of the first axis, "y" is a coordinate of the second axis, and "z" is a coordinate of the third axis.

5. The buffer memory of claim 1, wherein first data is read from a first plane having two directions selected among the first through third axes and simultaneously second data is written to the first plane.

6. The buffer memory of claim 5, wherein the second data is written to the first plane in the same order as the first data is read from the first plane.

7. An image capture device comprising:
an image capture unit configured to capture an image;
a main memory configured to store the image captured by the image capture unit;
a buffer memory configured to buffer the image captured by the image capture unit and to transmit the image; and a controller configured to control read operations and write operations of the buffer memory, wherein the buffer memory is address-mapped in three dimensions comprising a first axis, a second axis, and a third axis that are orthogonal to one another, wherein data is written to the buffer memory in only a first direction selected from among the first axis, the second axis, and the third axis, wherein data is read from the buffer memory in only a second direction selected from among the first axis, the second axis, and the third axis, and wherein the first direction and the second direction are different from each other.

8. The image capture device of claim 7, wherein the controller addresses the buffer memory clockwise to control the read and write operations and the controller writes second data captured by the image capture unit to the buffer memory and simultaneously reads first data from the buffer memory.

9. The image capture device of claim 8, wherein the controller simultaneously reads first data from the buffer memory and stores the first data in the main memory.

10. The buffer memory of claim 7, wherein the buffer memory has the same data storage capacity in each of the directions of the first through third axes.

11. The buffer memory of claim 10, wherein the data storage capacity is $2^N$ bytes where N is a natural number.

12. The buffer memory of claim 11, wherein the buffer memory is address-mapped by {z[N−1:0], y[N−1:0], x[N−1:0]} where "x" is a coordinate of the first axis, "y" is a coordinate of the second axis, and "z" is a coordinate of the third axis.

13. A display device comprising:
a main memory configured to store an image;
a buffer memory configured to buffer the image stored in the main memory and transmit the image to the display unit; and
a display unit configured to output the image transmitted from the buffer memory;
a controller configured to control a read operation or a write operation of the main memory or the buffer memory,
wherein the buffer memory is address-mapped in three dimensions comprising a first axis, a second axis, and a third axis that are orthogonal to one another, wherein data is written to the buffer memory in only a first direction selected from among the first axis, the second axis, and the third axis, wherein data is read from the buffer memory in only, a second direction selected from among the first axis, the second axis, and the third axis, and wherein the first direction and the second direction are different from each other.

14. The display device of claim 13, wherein the controller addresses the buffer memory counterclockwise to control the read and write operations and the controller writes second data stored in the main memory to the buffer memory and simultaneously reads first data from the buffer memory.

15. The display device of claim 14, wherein the controller simultaneously reads first data from the buffer memory.

16. The buffer memory of claim 13, wherein the buffer memory has the same data storage capacity in each of the directions of the first through third axes.

17. The buffer memory of claim 16, wherein the data storage capacity is $2^N$ bytes where N is a natural number.

18. The buffer memory of claim 17, wherein the buffer memory is address-mapped by {z[N−1:0], y[N−1:0], x[N−1:0]} where "x" is a coordinate of the first axis, "y" is a coordinate of the second axis, and "z" is a coordinate of the third axis.

19. A buffer memory for rotating an image, the buffer memory being address-mapped in three dimensions comprising a first axis, a second axis, and a third axis, orthogonal to one another, wherein data is written to the buffer memory in a first direction selected from among the first axis, the second axis, and the third axis, wherein data is read from the buffer memory in a second direction selected from among the first axis, the second axis, and the third axis, and wherein the first direction is different from the second direction, wherein the buffer memory has the same data storage capacity in each of the directions of the first through third axes.

* * * * *